US007555432B1

(12) United States Patent
Gopalan

(10) Patent No.: US 7,555,432 B1
(45) Date of Patent: Jun. 30, 2009

(54) AUDIO STEGANOGRAPHY METHOD AND APPARATUS USING CEPSTRUM MODIFICATION

(75) Inventor: Kaliappan Gopalan, Munster, IN (US)

(73) Assignee: Purdue Research Foundation, West Lafayette, IN (US)

( * ) Notice: Subject to any disclaimer, the term of this patent is extended or adjusted under 35 U.S.C. 154(b) by 288 days.

(21) Appl. No.: 11/352,386

(22) Filed: Feb. 10, 2006

Related U.S. Application Data

(60) Provisional application No. 60/651,707, filed on Feb. 10, 2005.

(51) Int. Cl.
*G10L 21/00* (2006.01)
*G06F 17/00* (2006.01)

(52) U.S. Cl. ...................... 704/273; 700/94; 704/200.1; 380/252

(58) Field of Classification Search ................. 704/273, 704/200.1; 700/94; 380/236, 252
See application file for complete search history.

(56) References Cited

U.S. PATENT DOCUMENTS 5,893,067 A 4/1999 Bender et al.
6,061,793 A * 5/2000 Tewfik et al. ............... 713/176
7,035,700 B2 4/2006 Gopalan et al.
7,058,570 B1 * 6/2006 Yu et al. ..................... 704/219
7,277,871 B2 * 10/2007 Suzuki et al. ................. 705/57
2003/0036910 A1 * 2/2003 Van Der Veen et al. ..... 704/500
2003/0176934 A1 * 9/2003 Gopalan et al. ............... 700/94
2004/0204943 A1 10/2004 Kirovski et al.
2005/0159831 A1 7/2005 Gopalan et al.

OTHER PUBLICATIONS

Nedeljko Cvejic, "Algorithms for audio watermarking and steganography", Thesis, University of Oulu, Finland, 2004.*
Cui et al, "The Application of Binary Image In Digital Audio Watermarking", IEEE Int. Conf. Neural Networks and Signal Processing, Nanjing, China, 2003.*
Alsalami et al, "Digital Audio Watermarking: Survey", De Montfort University, UK, 2003.*
Pam, "Audio Watermarking", Research report, University of Auckland, New Zealand, 2003.*
Gopalan et al. "Covert speech communication via cover speech by tone insertion", IEEE, Proceeding of Aerospace Conference, 2003.*

(Continued)

*Primary Examiner*—Talivaldis Ivars Smits
*Assistant Examiner*—Jialong He
(74) *Attorney, Agent, or Firm*—William F. Bahret

(57) ABSTRACT

Audio steganography methods and apparatus using cepstral domain techniques to make embedded data in audio signals less perceivable. One approach defines a set of frames for a host audio signal, and, for each frame, determines a plurality of masked frequencies as spectral points with power level below a masking threshold for the frame. The two most commonly occurring masked frequencies f1 and f2 in the set of frames are selected, and a cepstrum of each frame is modified to produce complementary changes of the spectrum at f1 and f2 to correspond to a desired bit value. Another aspect of the invention involves determining a masking threshold for a frame, determining masked frequencies within the frame having a power level below threshold, obtaining a cepstrum of a sinusoid at a selected masked frequency, and modifying the frame by an offset to correspond to an embedded data value, the offset derived from the cepstrum.

15 Claims, 10 Drawing Sheets

Data embedding and retrieval in the log spectral domain

OTHER PUBLICATIONS

W. Bender et al., "Techniques for Data Hiding," *IBM Systems Journal*, vol. 35, Nos. 3 & 4, pp. 313-336, 1996.

M. D. Swanson, et al., "Multimedia Data-Embedding and Watermarking Technologies," Proc. IEEE, vol. 86, pp. 1064-1087, Jun. 1998.

R.J. Anderson et al., "On the Limits of Steganography," *IEEE Journal of Selected Areas in Communications*, vol. 16, No. 4, pp. 474-481, May 1998.

N. Cvejic et al, "Audio Watermarking Using m-Sequences and Temporal Masking," Proc. 2001 IEEE Workshop on the Applications of Signal Processing to Audio and Acoustics, pp. 227-230, Oct. 2001.

K. Gopalan et al., "Covert Speech Communication Via Cover Speech by Tone Insertion," Proc. 2003 IEEE Aerospace Conference, vol. 4, pp. 1647-1653, Mar. 2003.

K. Gopalan, "Audio Steganography Using Bit Modification," Proc. IEEE International Conference on Acoustics, Speech, and Signal Processing, (ICASSP '03), vol. 2, pp. 421-424, Apr. 2003.

S.K. Lee et al., "Digital Audio Watermarking in the Cepstrum Domain," *IEEE Trans. Consumer Electronics*, vol. 46, pp. 744-750, Aug. 2000.

X. Li et al., "Transparent and Robust Audio Data Hiding in Cepstrum Domain," *Proc. IEEE International Conference on Multimedia and Expo, (ICME 2000)*, New York, NY, 2000.

C.-T. Hsieh et al., "Blind Cepstrum Domain Audio Watermarking Based on Time Energy Features," 14th International Conference on Digital Signal Processing, 2002, vol. 2, pp. 705-708, Jul. 2002.

K. Gopalan, "Cepstral Domain Modification of Audio Signals for Data Embedding: Preliminary Results," Proc. of SPIE, Security, Steganography, and Watermarking of Multimedia Contents VI, San Jose, CA, Jan. 2004.

* cited by examiner

Fig. 2 Data embedding and retrieval in the log spectral domain

AUDIO STEGANOGRAPHY METHOD AND APPARATUS USING CEPSTRUM MODIFICATION

CROSS-REFERENCE TO RELATED APPLICATION

This application claims the benefit of U.S. Provisional Patent Application Ser. No. 60/651,707, filed Feb. 10, 2005.

GOVERNMENT RIGHTS

This invention was made with government support under Contract/Grant No. F30602-03-1-0070 awarded by the Air Force Research Laboratory, Air Force Material Command, USAF. The government has certain rights in the invention.

TECHNICAL FIELD OF THE INVENTION

The present invention relates generally to audio steganography and, more particularly, to methods for making embedded data less perceivable.

BACKGROUND OF THE INVENTION

Embedding information in audio signals, or audio steganography, is vital for secure covert transmission of information such as battlefield data and banking transactions via open audio channels. On another level, watermarking of audio signals for digital rights management is becoming an increasingly important technique for preventing illegal copying, file sharing, etc. Audio steganography, encompassing information hiding and rights management, is thus gaining widespread significance in secure communication and consumer applications. A steganography system, in general, is expected to meet three key requirements, namely, imperceptibility of embedding, correct recovery of embedded information, and large payload. Practical audio embedding systems, however, face hard challenges in fulfilling all three requirements simultaneously due to the large power and dynamic range of hearing, and the large range of audible frequency of the human auditory system (HAS). These challenges are more difficult to surmount than those faced by image and video steganography systems due to the relatively low visual acuity and large cover image/video size available for embedding.

One of the commonly employed techniques to overcome the embedding limitations due to the acute sensitivity of the HAS is to embed data in the auditorily masked spectral regions. Frequency masking phenomenon is a psychoacoustic masking property of the HAS that renders weaker tones in the presence of a stronger tone (or noise) inaudible. A large body of embedding work has been reported with varying degrees of imperceptibility, data recovery and payload, all exploiting the frequency masking effect for watermarking and authentication applications.

Psychoacoustical, or auditory, masking is a perceptual property of the HAS in which the presence of a strong tone makes a weaker tone in its temporal or spectral neighborhood imperceptible. This property arises because of the low differential range of the HAS even though the dynamic range covers 80 dB below ambient level. In temporal masking, a faint tone becomes undetected when it appears immediately before or after a strong tone. Frequency masking occurs when human ear cannot perceive frequencies at lower power level if these frequencies are present in the vicinity of tone or noise-like frequencies at higher level. Additionally, a weak pure tone is masked by wide-band noise if the tone occurs within a critical band. The masked sound becomes inaudible in the presence of another louder sound; the masked sound is still present, however.

By exploiting the limitation of the HAS in not perceiving masked sounds, an audio signal can be efficiently coded for transmission and storage as in ISO-MPEG audio compression and in Advanced Audio Coder algorithms. While the coder represents the original audio by changing its characteristics, a listener still perceives the same quality in the coded audio as the original. The same principle is extended to embedding information by utilizing the frequency masking phenomenon directly or indirectly.

General steganography procedure employing the frequency masking property begins with the calculation of the masker frequencies—tonal and noise-like—and their power levels from the normalized power spectral density (PSD) of each frame of cover speech. A global (frame) threshold of hearing based on the maskers present in the frame is then determined. Also, the sound pressure level for quiet—below which a signal is generally inaudible—is obtained. As an example, the normalized power spectral density, threshold of hearing, and the absolute quiet threshold are shown in FIG. 1 for a frame of speech. The spectral component around 1000 Hz in this figure, for instance, is inaudible, or masked, because of its PSD being below the global masking threshold level at that frequency. It may be noticed that with the threshold at approximately 75 dB and the PSD at 52 dB, raising the PSD of the signal at 1000 Hz by as much as 15 dB will still render the component inaudible. (Raising the level much closer to the threshold may alter the threshold itself if the other components within the critical band are lower than the new level at 1000 Hz.) In addition to modifying the PSD, the phase at 1000 Hz can also be changed without causing noticeable perceptual difference. Many other such 'psychoacoustical perceptual holes,' or masked points, can be detected over the range of frequencies present in the signal frame. The PSD values and/or the phase values at these holes can be modified in accordance with information to be embedded, with little effect on the perceptual quality of the frame. Alternatively, the phase in the perceptually significant regions can be changed by a small value. Here, the inability of the HAS in perceiving absolute phase, as opposed to relative phase, is used to achieve imperceptible embedding.

In employing frequency-masked regions directly for data embedding, phase and/or amplitude of spectral components at one or more frequencies in the masked set are altered in accordance with the data. To accommodate varying quantization levels and noise in transmission, spectral amplitude modification is generally carried out as a ratio of the frame threshold. Examples of direct embedding in frequency-masked regions can be found in U.S. Patent Application Publication 2003/0176934 and U.S. Patent Application Publication 2005/0159831, which is incorporated by reference herein.

Embedding in temporally masked regions, typically for watermarking an audio signal, modifies the envelope of the audio with a preselected random sequence of data such that the modification is inaudible. Due to the small size and selection of data, however, temporal masking is primarily suited for watermarking applications.

Several steganography methods using indirect exploitation of frequency masking have been recently proposed with varying degrees of success. These methods typically alter speech samples by a small amount so that inaudibility is achieved without explicitly locating masked regions.

Cepstral domain features have been used extensively in speech and speaker recognition systems, and speech analysis applications. Complex cepstrum $\hat{x}[n]$ of a frame of speech x[n] is defined as the inverse Fourier transform of the complex logarithm of the spectrum of the frame, as given by $$\hat{x}[n] = F^{-1}[\ln[F(x[n])]] = \frac{1}{2\pi}\int_{-\pi}^{\pi}\ln X(e^{j\omega})e^{j\omega n}d\omega \tag{1}$$

where $$X(e^{j\omega}) = F[x[n]] = \sum_{k=-\infty}^{\infty} x[k]e^{-j\omega k} = |X(e^{j\omega})|e^{j\theta(\omega)} \tag{2}$$

is the discrete Fourier transform of x[n], with the inverse transform given by $$x[n] = \frac{1}{2\pi}\int_{-\pi}^{\pi} X(e^{j\omega})e^{j\omega n}d\omega, \tag{3}$$

and $$\ln X(e^{j\omega}) = \ln|X(e^{j\omega})| + j\theta(\omega),\ \theta(\omega) = \arg[X(e^{j\omega})] \tag{4}$$

is the complex logarithm of the DFT of x[n].

While real cepstrum (without the phase information given by the second term in Eq. (4)) is typically used in speech analysis and speaker identification applications, complex cepstrum is needed for embedding and watermarking to obtain the cepstrum-modified speech. If a frame of speech samples is represented by $$x[n] = e[n] * h[n] \tag{5}$$

where e[n] is the excitation source signal and h[n] is the vocal tract system model, Eq. (4) above becomes $$\ln[X(e^{j\omega})] = \ln[E(e^{j\omega})] + \ln[H(e^{j\omega})] \tag{6}$$

The ability of the cepstrum of a frame of speech to separate the excitation source from the vocal tract system model, as seen above, indicates that modification for data embedding can be carried out in either of the two parts of speech. Imperceptibility of the resulting cepstrum-modified speech from the original speech may depend upon the extent of changes made to the pitch (high frequency second term) and/or the formants (low frequency first term), for instance.

Since the excitation source typically is a periodic pulse source (for voiced speech) or noise (for unvoiced speech) while the vocal tract model has a slowly varying spectral envelope, their convolutional result in Eq. (5) is changed to addition in Eq. (6). Hence, the inverse Fourier transform of the complex log spectrum in Eq. (6) transforms the vocal tract model to lower indices in the cepstral ("time", or quefrency) domain and the excitation to higher cepstral indices or quefrencies. Any modification carried out in the cepstral domain in accordance with data, therefore, alters the speech source, system, or both, depending on the quefrencies involved.

Prior work employing cepstral domain feature modification for embedding includes adding pseudo random noise sequence for watermarking with some success. Other prior work has observed that the statistical mean of cepstrum varies less than the individual cepstral coefficients and that the statistical mean manipulation is more robust than correlation-based approach for embedding and detection. More recently, prior work shows that by modifying the cepstral mean values in the vicinity of rising energy points, frame synchronization and robustness against attacks can be achieved.

SUMMARY OF THE INVENTION

The present invention provides an audio steganography method and apparatus which defines a first set of frames for a host audio signal, and, for each frame, determines spectral points having a power level below a masking threshold for the frame. One of the most commonly occurring of those spectral points is selected, and a parameter of the selected spectral point is modified in each of a second set of frames of the host audio signal in accordance with a desired value of data in the frame.

According to another aspect of the present invention, a method and apparatus are provided for embedding data in a frame of a host audio signal using cepstral modification. The method and apparatus determine a masking threshold for the frame, determine masked frequencies within the frame having a power level below the masking threshold, select a masked frequency, obtain a cepstrum of a sinusoid at the selected masked frequency, and modify the frame by an offset to correspond to an embedded data value, the offset derived from the cepstrum of the masked frequency.

The objects and advantages of the present invention will be more apparent upon reading the following detailed description in conjunction with the accompanying drawings.

DETAILED DESCRIPTION OF PREFERRED EMBODIMENTS

Figure 1:
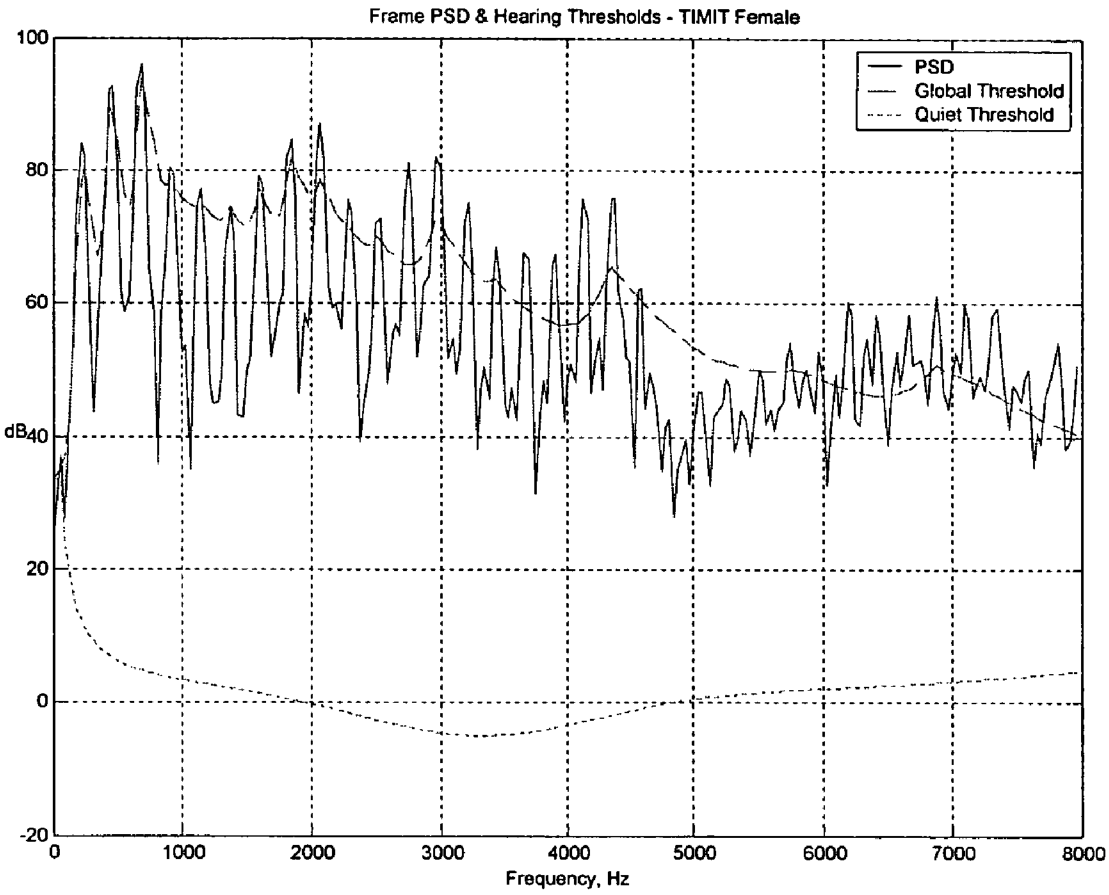
FIG. 1 is an example of a speech frame hearing thresholds and PSD.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 2:
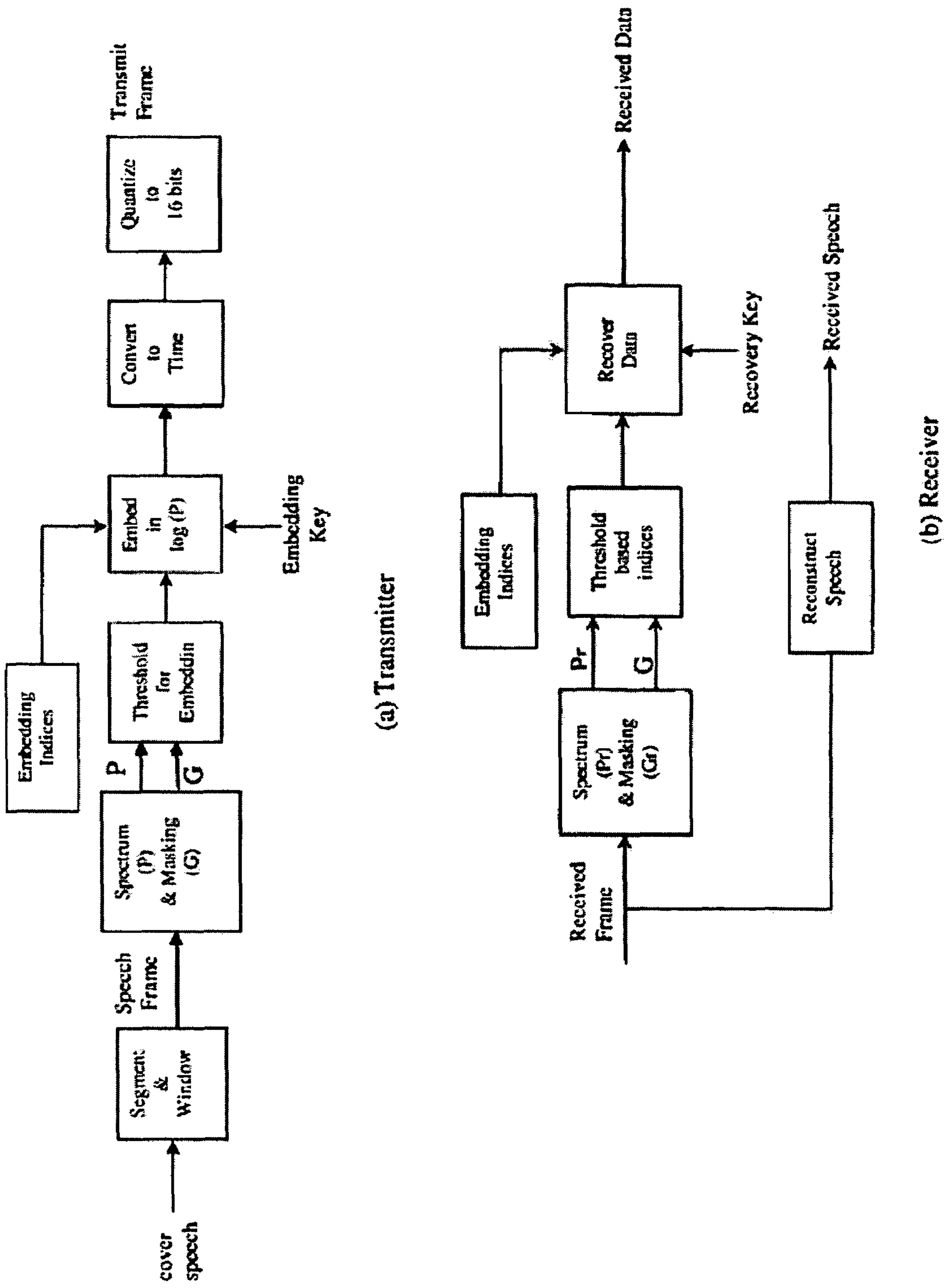
FIG. 2*a* is a block diagram of an audio steganography processor used for data embedding, in this case embedding in the log spectral domain.
FIG. 2*b* is a block diagram of an audio steganography processor used for data retrieval.

One method of spectral domain embedding based on perceptual masking is log spectral domain embedding. In this method, similar to modifying speech spectrum in accordance with data at perceptually masked spectral points, each frame of speech is processed to obtain normalized PSD—sound pressure level—along with the global masking threshold of hearing for the frame and the quiet threshold of hearing, as shown in FIG. 2*a*. A set of potential indices for embedding over a selected range of frequencies is initialized for a given cover audio signal. This set forms a key for embedding and retrieval of data. Since altering the log spectrum at critical frequencies alters speech quality significantly, indices corresponding to critical frequencies and their immediate neighbors are excluded from this index set. From the frame PSD and the masking threshold, the set of potential spectral indices for embedding is determined based on the PSD being below the threshold. Indices in this set that are common to the initial potential set ("key") form the 'embeddable' set of spectral indices for modification. Since the log spectrum at all the embeddable indices in a frame is below the masking threshold, a bit of 0 or 1 is embedded by setting the log spectrum to one of two values of the log of the masking threshold at the corresponding indices.

Choice of the ratios for setting bits 1 and 0 forms the second key for embedding and recovery. A frame carries only one bit by the modification of its log spectrum at all embeddable indices. This modified log spectrum has the same ratio with the log of the masking threshold. The spectrum-modified frame is converted to time domain and quantized to 16 bits for transmission.

For oblivious detection, each received frame is processed to obtain its masking threshold and power spectral density in the log domain as shown in FIG. 2*b*. With a margin set for the ratios employed for embedding at the transmitter, potential log spectral indices that were modified at the transmitter and are in the frequency range for embedding are determined. After eliminating critical frequencies and their neighbors, the two sets of indices corresponding to modification for bit 1 and 0 are obtained. Since a frame carries only one bit, only one set of indices—for bit 1 or 0—must, ideally, be available. Due to quantization, however, log spectral values at some indices are altered to lower than their original values. This may also arise from low levels of transmission noise. Because of this, the value of the transmitted bit is decided by the majority of the indices for bits 1 and 0.

The above method was applied to a clean cover utterance (from TIMIT database) and a noisy utterance (from an air traffic controller (ATC) database). Utterances in the TIMIT (Texas Instruments Massachusetts Institute of Technology) database were obtained at a sampling rate of 16000 samples/s while those in the ATC were obtained at 8000 samples/s, with 16 bits/sample in both cases. The results for a single set of embedding frequency range for each case are shown in Table 1. Data bit in each case was generated randomly for each frame.

TABLE 1

Results of embedding in the log spectral domain

| Cover audio | Freq. range | Stego imperceptible from host? | Embedding Detectible in Spectrogram? | Bit Error Rate | Embedded bit rate, Bits/s |
|---|---|---|---|---|---|
| Clean (TIMIT) | 5000 Hz-7000 Hz | Yes | No | 4/208 = 1.92% | 62.14 |
| Clean (TIMIT) | 2000 Hz-4000 Hz | No | Yes | 12/208 = 5.77% | 62.14 |
| Noisy (ATC) | 2000 Hz-3000 Hz | Yes | Yes | 8/316 = 2.53% | 62.21 |
| Noisy (ATC) | 1000 Hz-2000 Hz | Yes | No | 60/316 = 18.99% | 62.21 |

Figure 3:
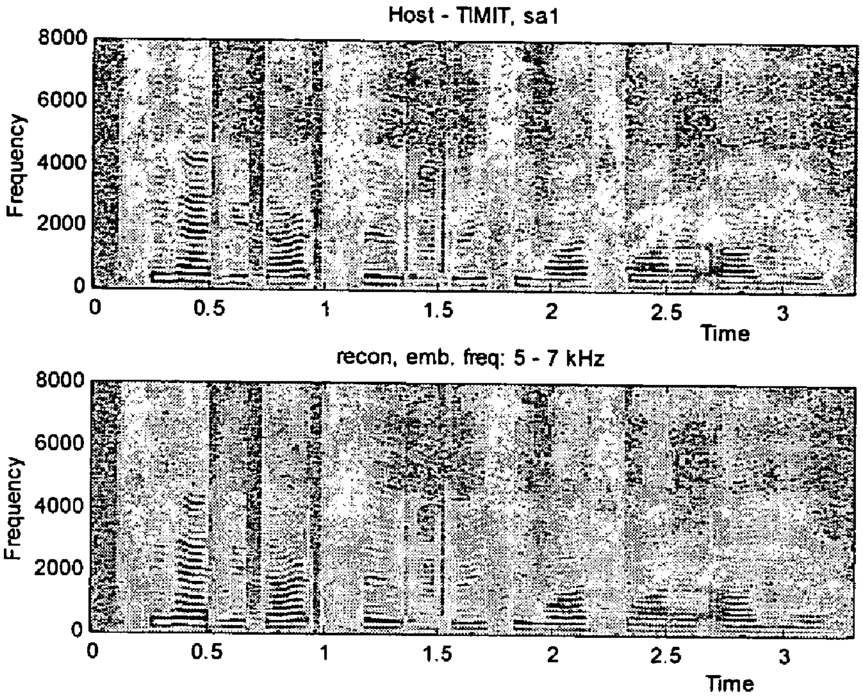
FIG. 3 shows spectrograms of host and stego (host signal with data embedded therein) for a clean utterance with embedding in the log spectrum in the frequency range of 5 kHz to 7 kHz.
Figure 4:
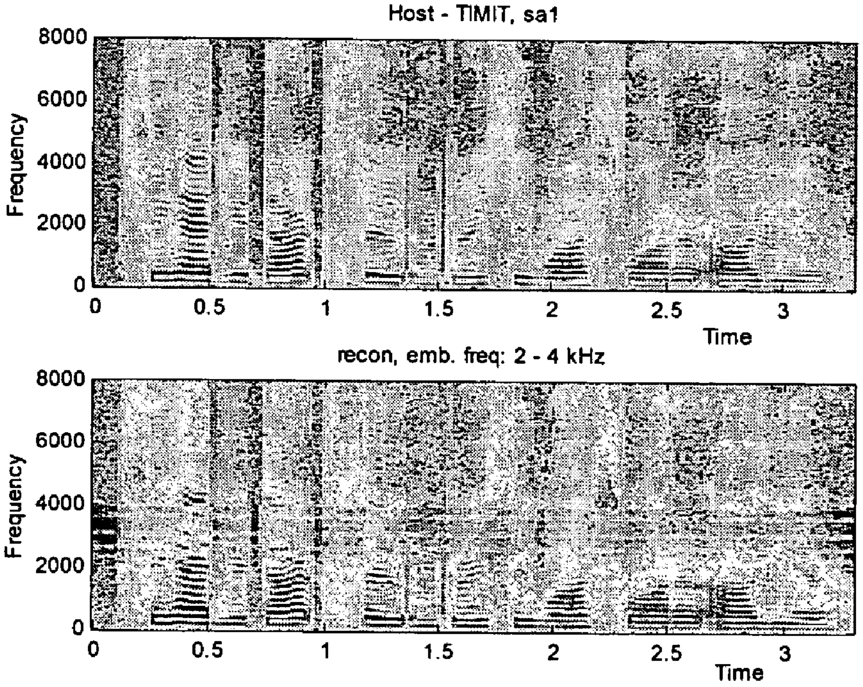
FIG. 4 shows spectrograms of host and stego for a clean utterance with embedding in the log spectrum in the frequency range of 2 kHz to 4 kHz.

For the clean cover speech (sampled at 16 kHz), embedding in the 5 kHz to 7 kHz range yielded the best result in that the stego was imperceptible from the host in both listening and spectrogram, and the bit error rate (BER) was less than 2 percent. FIG. 3 shows the spectrograms of the host and stego. By using 512 samples/frame with 256-sample overlap, the method gives an embedding bit rate of 208 bits in 3.347 s, or approximately 62 bits/s. At the second range of frequency—from 2 kHz to 4 kHz—embedding was noticeable in both listening and spectrogram (FIG. 4) and also resulted in large number of bit errors. The formant trajectory for the cover audio used shows a strong formant in the embedding frequency range; hence, the log spectrum modification resulted in affecting the formant by the embedding and quantization. It may be possible to use a different set of ratios for setting bits 1 and 0 that minimizes the effect of quantization noise without affecting the formant.

Figure 5:
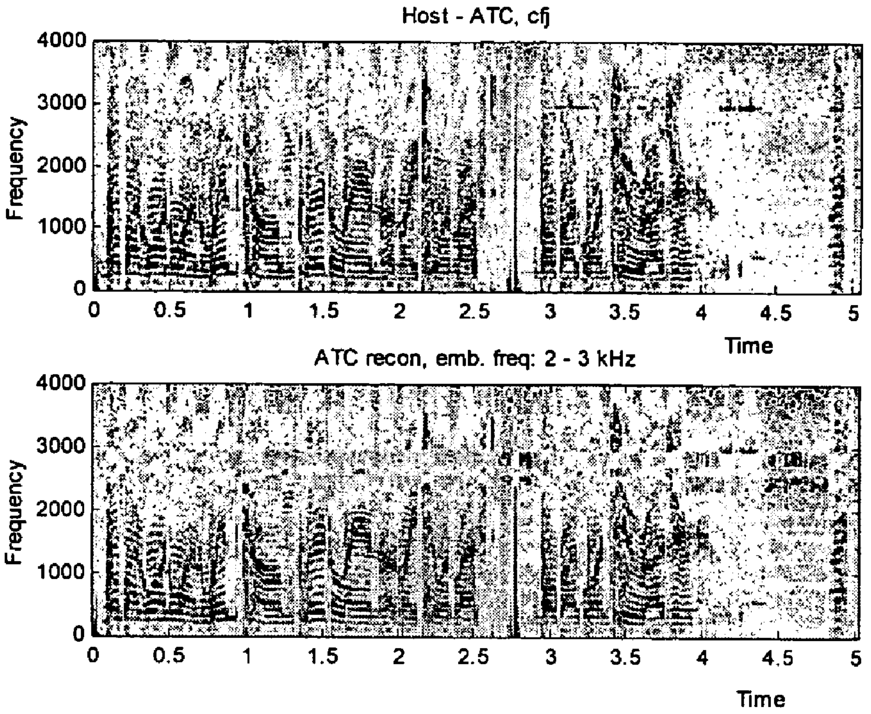
FIG. 5 shows spectrograms of host and stego for a noisy utterance with embedding in the log spectrum in the frequency range of 2 kHz to 3 kHz.

The results obtained were similar for the noisy cover utterance available at the sampling rate of 8000 samples/s. At a frame size of 256 samples with 128 sample overlap, the embedding rate was 316 bits in 5.08 s, or approximately 62 bits/s. When the log spectrum was modified in the 2 kHz to 3 kHz range, no audible difference was detected in the stego in informal tests; the spectrogram, however, showed marked differences (FIG. 5).

Figure 6:
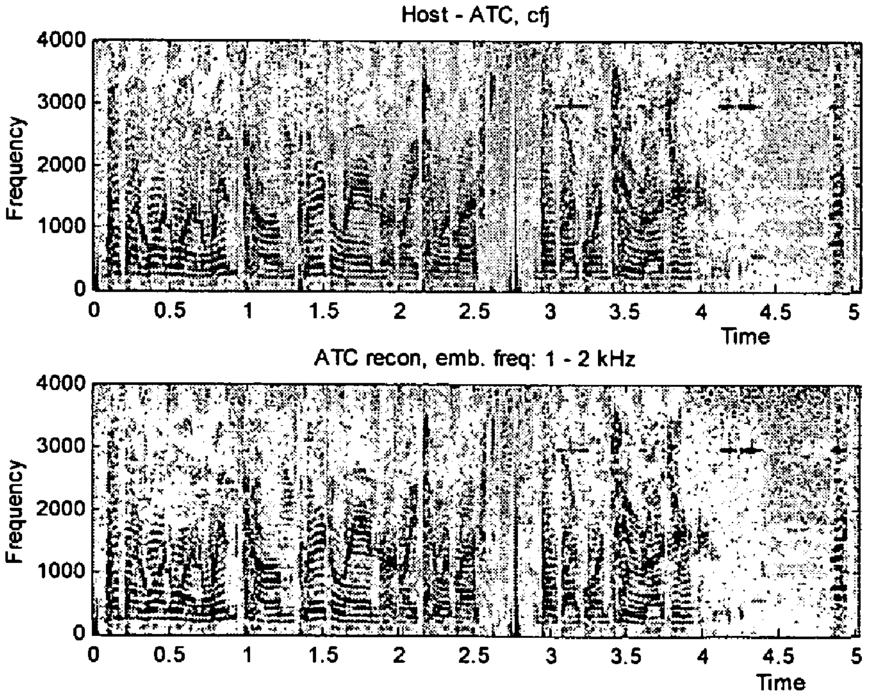
FIG. 6 shows spectrograms of host and stego for a clean utterance with embedding in the log spectrum in the frequency range of 1 Hz to 2 kHz.

While the BER was small, and the stego was imperceptible from the host, embedding was not concealed in the spectrogram. Hence, this frequency range may be more suitable for watermarking a few frames of commercial audio signals than for steganography applications. Employing a lower frequency range of 1 kHz to 2 kHz resulted in better concealed embedding in audibility and visibility of the stego (FIG. 6). However, at a BER of 60/316, or about 19 percent, the algorithm for covert data transmission preferably includes error detection and correction techniques.

In another audio steganography method, employing cepstrum modification, the cepstrum of each frame of host speech is modified to carry data without causing audible difference. In this method, the mean of the cepstrum of a selected range of quefrencies is modified in a nonreturn-to-zero mode by first removing the mean of a frame cepstrum. A contiguous range of cepstral indices n1:n2, which is split into n1:nm and nm+1:n2, where nm is the midpoint of the range, is used for embedding in the mean-removed complex cepstrum, c(n). Bit 1 or 0 is embedded in c(n) as follows to result in the modified cepstrum, $c_m(n)$.

Initialize: $c_m(n)=c(n)$, for all n in frame

To embed bit 1: $c_m(n1{:}nm)=c(n1{:}nm)+a(\max(c(n1{:}n2)))$;

$c_m(nm+1{:}n2)=c(nm+1{:}n2)-a(\max(c(n1{:}n2)))$;

To embed bit 0: $c_m(n1{:}nm)=c(n1{:}nm)-a(\max(c(n1{:}n2)))$;

$c_m(nm+1{:}n2)=c(nm+1{:}n2)+a(\max(c(n1{:}n2)))$;

The scale factor a by which the cepstrum of each half of the selected range of indices is modified is determined empirically to minimize audibility of the modification for a given cover signal.

To retrieve the embedded bit without the cover audio, the mean of the received frame cepstrum is removed. Since the transmitted frame has a different mean in the range n1:nm than in the range nm+1:n2, the received bit is determined as 1 if the first range has a higher mean than the second, and 0 otherwise. This simple detection strategy eliminates the need for estimation of the scale factor a; however, it also constrains detection in a more accurate manner. Table 2 shows the results using the simple mean modification technique for embedding in a clean and a noisy cover audio.

Figure 7:
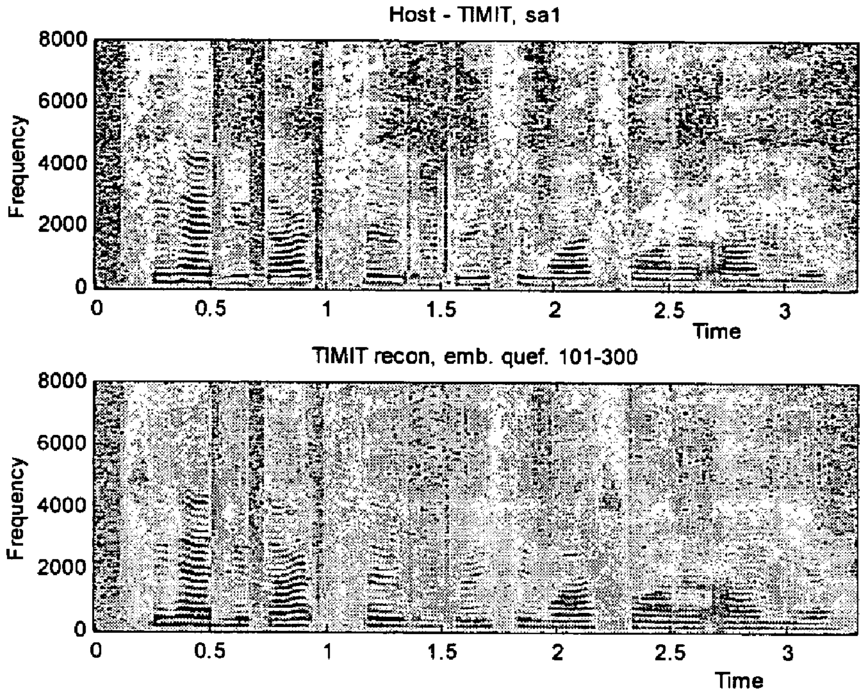
FIG. 7 shows spectrograms of host and stego for a clean utterance with embedding in the quefrency range of 101 to 300.
Figure 8:
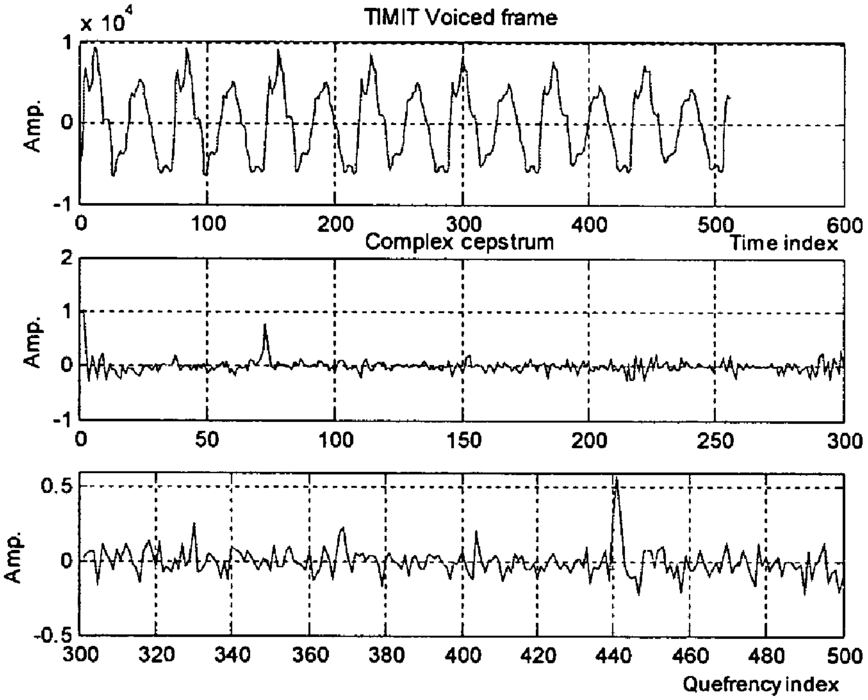
FIG. 8 shows a frame of voiced speech and its complex cepstrum.

As seen from Table 2, modifying the mean-removed cepstrum at lower range of quefrencies resulted in better embedding and retrieval of data for both the clean and noisy cover utterances. Spectrogram of the stego displayed very little difference compared to that of the clean utterance (FIG. 7), and barely visible difference for the noisy utterance. Consequently, the speech quality of the stego audio in each case was also hardly distinguishable from that of the corresponding host audio. Although the cepstral range chosen for modification was arbitrary, the lower range in both cases is likely to modify the vocal tract system function rather than the excitation source. FIG. 8 shows a voiced frame of the TIMIT cover utterance and its complex cepstrum. The middle trace showing the cepstrum for indices 1 to 300 has no periodic repetition while the bottom trace corresponding to indices 301 to 500 displays diminishing peaks at intervals of approximately 35 quefrency samples. The repetitive peaks correspond to excitation at fundamental frequency. Hence, small changes in the lower quefrency indices of 1 to 300-akin to changing the system poles and zeros—modify only the vocal tract model slightly; this modification is likely to result in negligible change in speech quality.

Figure 9:
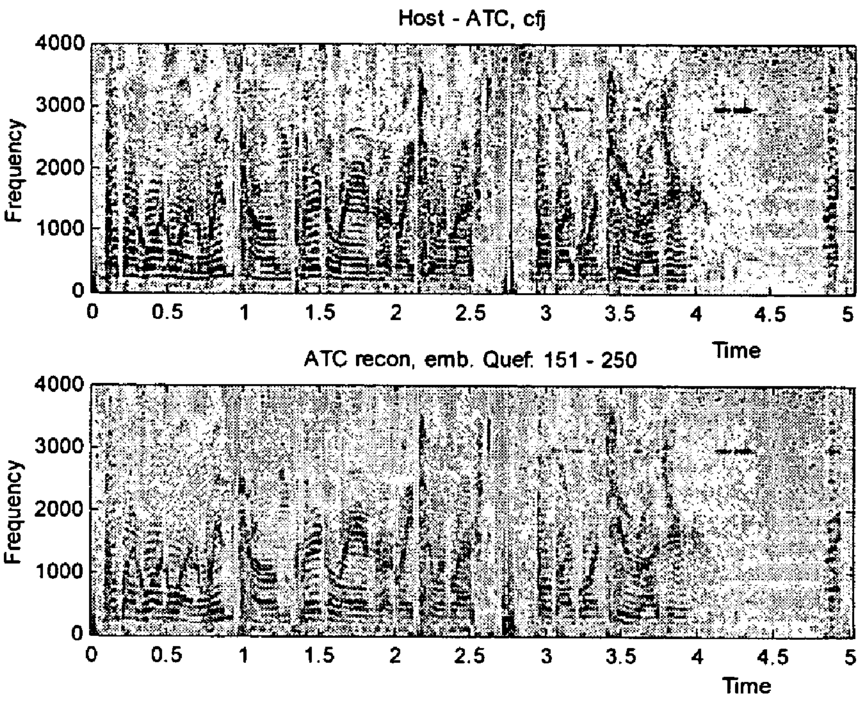
FIG. 9 shows spectrograms of host (top) and stego for a clean utterance with embedding by cepstrum modification in the quefrency range of 151 to 250.

When the cepstrum at higher indices is modified, changes occur in the excitation signal in a nonuniform manner, especially if the indices do not cover all pitch harmonics. Thus the embedding manifests around the fundamental frequency in the spectrogram, and as low frequency audio gliding over an otherwise indistinguishable cover audio. FIG. 9 shows the spectrograms of the noisy cover audio and the stego with cepstrum modified in the quefrency range of 150 to 250. In this case, the regions of noise (due to microphone click) are stretched in time, in addition to changes in the vicinity of the fundamental frequency.

As with the log spectral embedding, frames with silence and voiced/unvoiced transitions caused errors in data retrieval. This problem may be minimized by skipping transitional frames without embedding. By using only voiced frames, it may be possible to alter the cepstrum with two bits, both modifying the vocal tract region. Alternatively, cepstrum between pitch pulses may be modified to avoid changes to excitation source. However, a key problem observed was that frames with no data bit embedded could not be distinguished from those carrying data. As the results shown in the figures indicate, imperceptible embedding can be carried out with all the frames embedded. While this is not desirable for covert

TABLE 2

Results of embedding in the cepstral domain by mean cepstrum modification

| Cover audio | Quefrency range | Stego imperceptible from host? | Embedding Detectible in Spectrogram? | Bit Error Rate | Embedded Bit rate, Bits/s |
|---|---|---|---|---|---|
| Clean (TIMIT), fs = 16 kHz | 101:300 | Yes@ | Slightly# | 3/208 = 1.44% | 62.14 |
| Clean (TIMIT), fs = 16 kHz | 301:500 | No- low freg. noise | Slightly# | 22/208 = 10.58% | 62.14 |
| Noisy (ATC), fs = 8 kHz | 51:150 | Yes | Slightly* | 4/316 = 1.27% | 62.21 |
| Noisy (ATC), fs = 8 kHz | 151:250 | Yes+ | Slightly* | 37/316 = 11.71% | 62.21 |

@Barely detectible
#Noticeable around fundamental frequency
+Very little difference was heard by listeners.
*More marked in the white noise band than around fundamental frequency communication, the technique is useful for unobtrusive watermarking of every frame of audio signals. Watermarking with two bits hidden in each frame is particularly effective for digital rights management applications.

In a more preferred method of embedding data in audio signals using cepstral domain modification, the cepstrum is altered—rather than the mean—in regions that are psychoacoustically masked to ensure imperceptibility and data recovery.

To improve BER further and to embed at specific points in a host audio using a key, a two-step procedure has been developed. In the first step, a pair of masked frequencies that occur most frequently in a given host audio is obtained as follows. For each frame of cover speech, normalized power spectral density—corresponding to sound pressure level (in dB)—and masking threshold (in dB) are determined and the frequency indices at which the PSD is below a set dB are obtained. To avoid altering silence intervals between phonemes or before plosives, or low energy fricatives, only those frames that have a minimum number of masked points are considered. For the entire length of cover speech, a count of the number of occurrences of each frequency index in the masked region of a frame is obtained. From this count, a pair of the two most commonly occurring spectral points are chosen for modification.

Alternatively, the spectral points that are the farthest from the masking threshold of each frame are obtained. These points have the largest leeway in modifying the spectrum or cepstrum in most of the frames of the cover speech.

In the second step, complex cepstrum of a sinusoid at each of the two selected frequencies f1 and f2, which form a key, are obtained with the maximum amplitude of the sinusoid set to the full quantization level of the given cover speech. For each frame of speech that is to be embedded (that is, the frame does not correspond to silence or low energy speech, as determined in the first step with fewer masked points), its complex cepstrum is modified as follows.

Initialize: Spectrum at f1 and f2=mean of frame spectrum at f1 and f2

$$\text{To embed a 1: } mod\_cep = cep + \alpha(c1(1:n)) - \beta(c2(1:n)) \quad (7a)$$

$$\text{To embed a 0: } mod\_cep = cep - \alpha(c1(1:n)) + \beta(c2(1:n)) \quad (7b)$$

where cep=original cepstrum of frame c1=cepstrum of sinusoid at frequency f1, and c2=cepstrum of sinusoid at frequency f2

The parameters α and β are set to low values (one-tenth, empirically, for example), or based on a fraction of frame power. Since the two frequencies are in the masked regions of most frames, adding or subtracting cepstra at these frequencies ensures that the modification results in minimal perceptibility in hearing. If no bit is to be embedded, the cepstrum is not modified after the initialization step.

Modified frame cepstrum is transformed to time domain and quantized to the same number of bits as the cover speech for transmission.

At the receiver, embedded information in each frame is recovered by the spectral ratio at the two frequencies, f1 and f2. That is, the recovered bit rb is given by $$rb = \begin{cases} 1, & \text{if } \log\left|\dfrac{X(f1)}{X(f2)}\right| \geq b1 \\ 0, & \text{if } \log\left|\dfrac{X(f2)}{X(f1)}\right| \geq b0 \\ -1(\text{no data}), & \text{else} \end{cases} \quad (8)$$

Since an unembedded frame is transmitted with the same spectral magnitude at f1 and f2, the spectral ratio at the receiver is close to unity; hence, no bit is retrieved. (The premise here is that quantization and channel noise are likely to affect the two frequencies without bias and that ratio is not affected significantly from unity. Only if the key, namely, the pair of embedding frequencies, is compromised and hence the power of one or the other is deliberately altered, will the ratio be far from unity.) Additionally, by embedding only in selected frames, a second key can be incorporated for added security. The indices of the embedded frames need not be transmitted or specified at the receiver.

The above two-step procedure was applied to (a) a clean host speech from the TIMIT database, and (b) a noisy utterance from the ATC database. For the clean speech sampled at 16,000 per second with 16 bits per sample, the first step of finding masked spectral points yielded a set of eight frequencies that were common in the masked regions of at least 100 frames out of a total of 208 frames. (The frame size used was 512 points with 256-point overlap.) The frame PSD at these masked frequencies was at least 3 dB down from their corresponding threshold sound pressure levels at the eight frequencies. Two of the eight frequencies were chosen for cepstrum modification. From the alternative set of masked frequencies—those that occurred with at least five other frequencies—frames that had fewer than six masked points were excluded from embedding. This exclusion ensures that any small change in the embedded PSD at the two selected frequencies is not likely to be noticeable in audibility or spectrogram as being different from other masked points. (We note that if a masked frequency occurs in isolation, for example, a change in PSD due to embedding may alter the threshold itself if the frequency is in the boundary of the critical band. Avoiding such isolated masked points reduces payload while increasing imperceptibility.)

Figure 10:
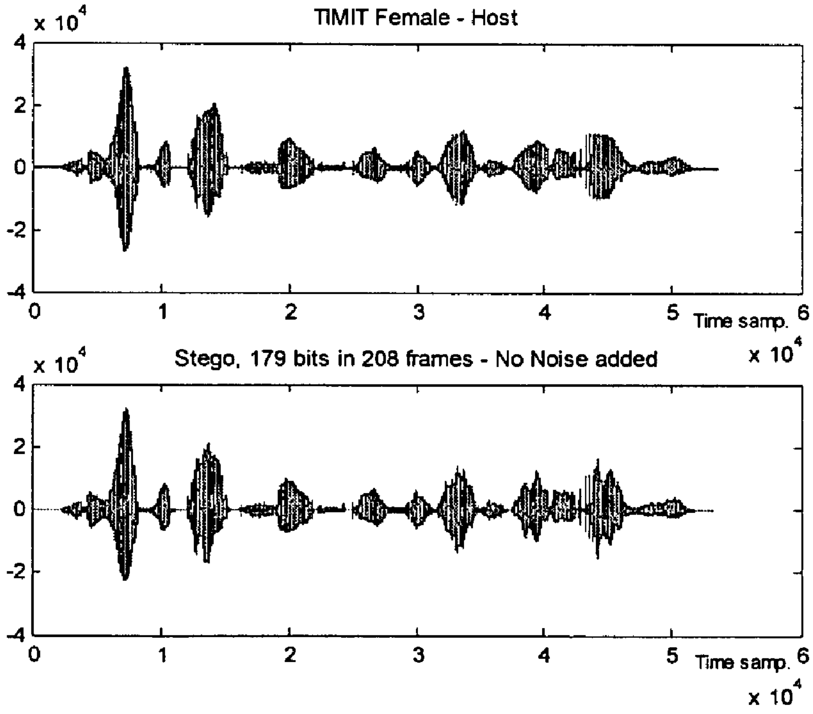
FIG. 10 shows waveforms of cover and stego with 179 bits by modifying cepstrum.
Figure 11:
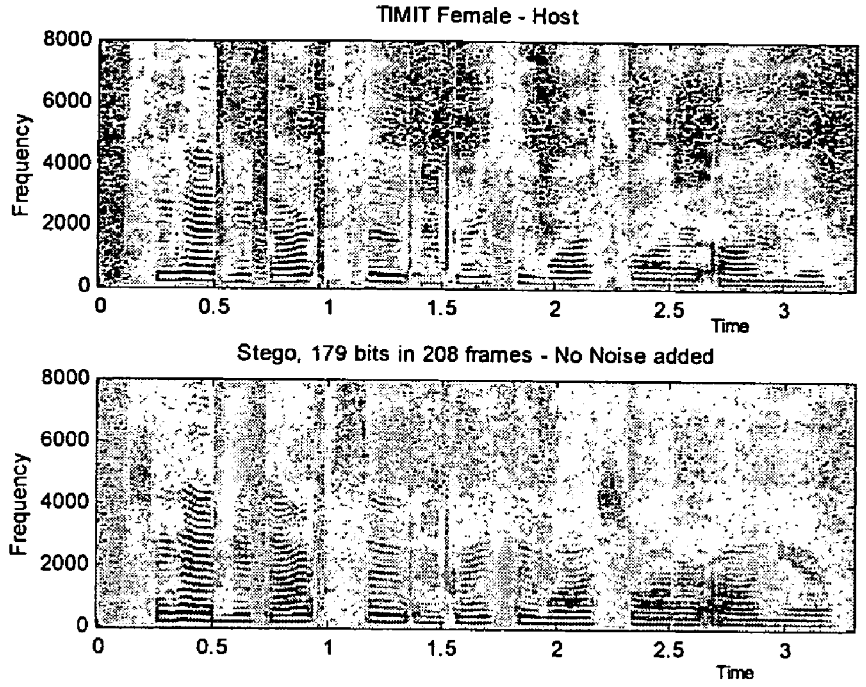
FIG. 11 shows spectrograms of cover and stego shown in FIG. 10.

With f1=906.25 Hz and f2=1218.8 Hz, and excluding 29 frames from cepstrum modification, the remaining 179 frames were embedded with (a) bit 0 in all, (b) bit 1 in all, (c) −1, i.e., no data, and (d) a random set of 179 bits. In each case, α=β=0.1 was used in Eq. (7). This gives a data hiding rate of approximately 54 bits/s for the cover speech used. Employing b1=b0=1.1 in Eq. (8), all the bits were retrieved correctly from the embedded frames that were quantized to 16 bits. No audible difference was detected between the original cover speech and the embedded speech. However, the reconstructed time waveform—the stego—showed a slightly noticeable difference as can be seen in FIG. 10. FIG. 11, which shows the spectrograms of the original and stego signals, appears to correspondingly emphasize spectral energy around f1 and f2.

A reason for the small difference in the waveform and spectrogram—and hence the visibility of embedding—is that the chosen pair of frequencies is in the masked region of only 24 frames with a difference of 6 dB or more lower than the masking threshold and PSD. At other frames, these frequencies may have lower than 6 dB margin, or not at all masked.

Figure 12:
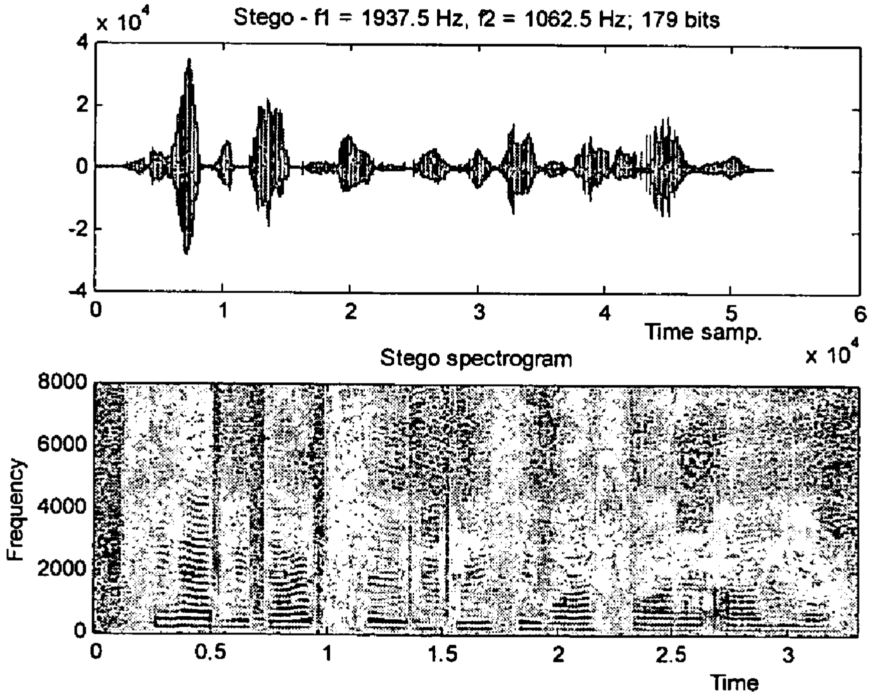
FIG. 12 shows stego waveform and spectrogram for modified cepstrum.

To prevent detectibility of cepstrum modification, an alternative pair of frequencies of f1=1937.5 Hz and f2=1062.5 Hz, which occurred in 95 out of the 179 frames with only a 3 dB margin, were selected. The results of embedding 179 bits—same values of 0, 1, −1, or random 179 bits—showed no discernible difference in audibility. Waveform and/or spectrogram indicated a small difference depending on the bit stream embedded; if a continuous stream of 1's or 0's is embedded, the increase in the strength of spectrum at the frequency results visible difference relative to the original waveform or spectrogram. Due to the low power, however, the difference is not audible. FIG. 12 depicts the waveform and spectrogram.

Figure 13:
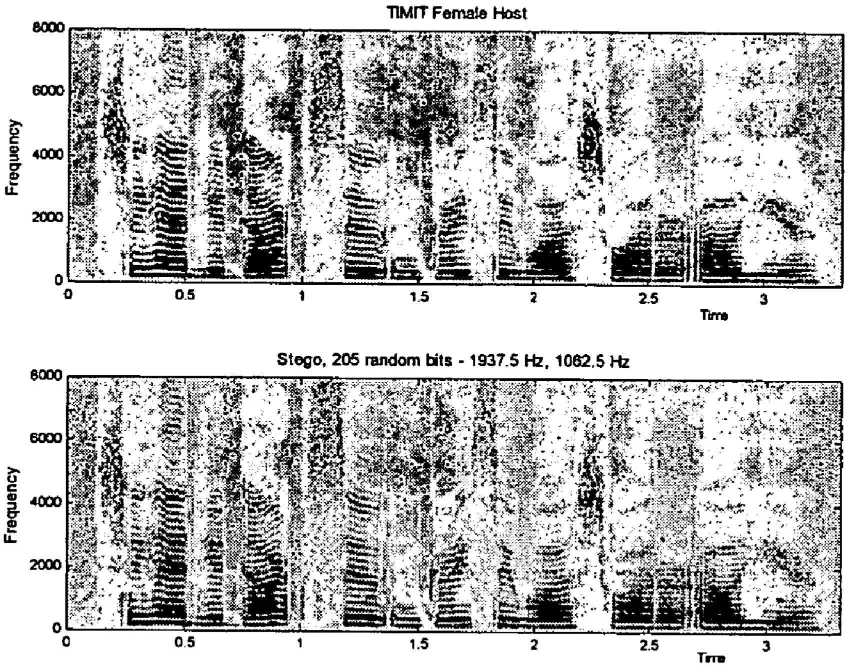
FIG. 13 shows spectrograms of host and stego with frames excluded from embedding.

Embedding capacity can be increased by modifying all the frames except those with consecutive silence frames. It was found that only three frames had extremely low energies for the TIMIT host used. By skipping these frames—which formed another key—embedding capacity was increased to 205 bits out of a total of 208 frames, giving an embedding rate of 61.6 bits/s. Since not all frames have the same two frequencies in the masked region, imperceptibility of embedded tone cepstra may not be guaranteed for those frames in which the frequencies are above their hearing threshold levels. However, because of the low power of the tones, they are not discernible in audibility or spectrograms. The only case where these tones, due to their presence in the perceptually significant regions, are audible or visible is when a consecutive number of low-energy frames have the same tone frequency modified. (These frames do not have the frequencies of the tones in their respective masked regions.) Since this requires a stream of 1's or 0's, all of which modify the same spectral point in a successive set of frames, it may not be a problem in practical covert communication applications. FIG. 13 shows the spectrograms of the same clean host as in FIG. 12 and the stego in which all but the three low energy frames are excluded from cepstrum modification.

Compared to the stego in FIG. 12, in which only 179 frames hide data, the spectrogram of the stego in FIG. 13 shows a slight striation around the tone frequency of 1937.5 Hz in the beginning part of the utterance (around 0.25 s). It turns out the random data had a string of four 1's followed by a string of four 0's embedded in frames 11 to 14 and 15 to 18, respectively. Since these frames correspond to relatively low energies in the durations of approximately 176 ms to 240 ms and 240 ms to 304 ms, they show the added spectral energies at one of the two frequencies. Careful inspection shows similar striations in spectrograms that are visible around 1.6 s, 2.3 s, 2.4 s and 2.7 s, for example, although these are not noticeable in speech quality. Thus the increase in payload is achieved with a slight visibility of embedding in the spectrogram. Clearly, for strong security of embedding in a clean utterance, low energy frames need to be excluded.

Figure 14:
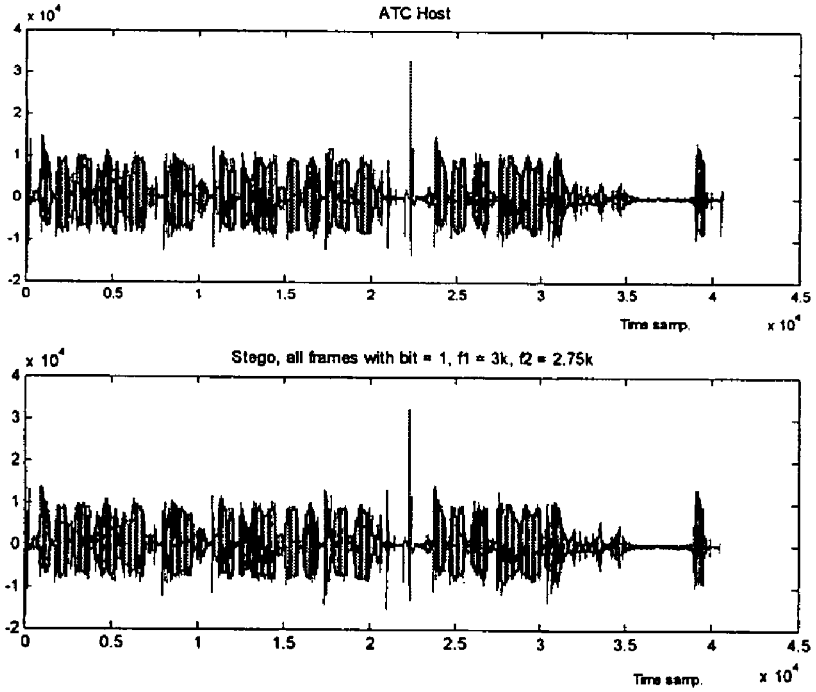
FIG. 14 shows a noisy host and stego with all frames carrying bit=1 by cepstrum modification at f1=3000 Hz and f2=2750 Hz.
Figure 15:
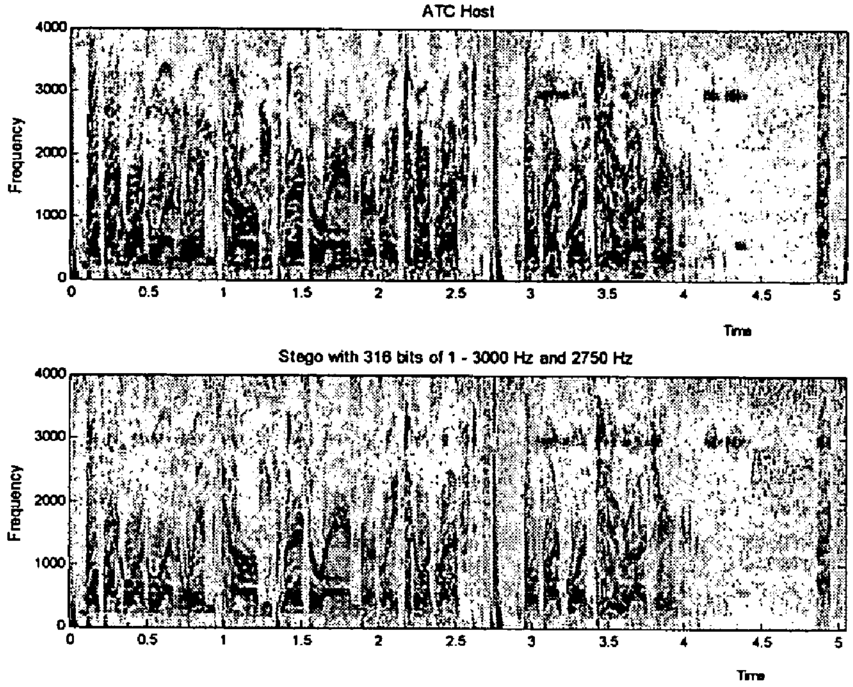
FIG. 15 shows spectrograms of a noisy host and stego with 316 bits of 1 embedded using cepstrum modification at f1=3000 Hz and f2=2750 Hz.

Using a noisy cover speech from the ATC database, similar results were observed for data recovery and imperceptibility, as indicated in Table 3. Because of the high level of noise in all frames in this case, no frame was excluded from embedding using the two most commonly occurred masked frequencies of 3000 Hz and 2750 Hz, although fewer than half the total number of frames had both frequencies in their masked regions. While the stego was undetectable in audibility or waveform (FIG. 14) for the case of hiding the bit 1 in all the 316 frames, the spectrogram shown in FIG. 15 clearly indicates the modification carried out at 3000 Hz.

Figure 16:
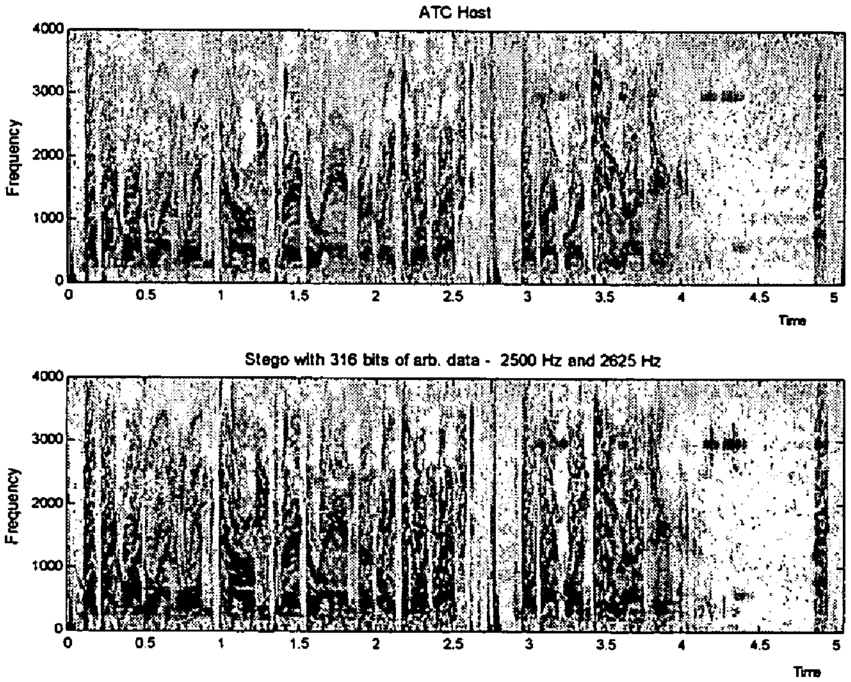
FIG. 16 shows spectrograms of a noisy host (top) and stego with 316 bits of arbitrary data embedded using cepstrum modification at f1=2625 Hz and f2=2500 Hz.

In practice, however, this is not a likely case since transmitting all 1's or 0's is not a useful application. FIG. 16 depicts spectrograms for the case of hiding a set of 316 bits of random data with one bit per frame by modifying cepstrum at f1=2625 Hz and f2=2500 Hz. Here again, these two frequencies are in the masked regions of fewer than 50 frames of the host consisting of 316 frames. Still, the method successfully embeds data with no audible or visible difference in the stego because of the large amount of noise in the cover speech. Thus, the noisy host used is more flexible in the choice of tone frequencies for cepstrum modification and also has higher payload than the clean host used. Table 3 summarizes the results for the two host speeches.

TABLE 3

Results of embedding in the cepstral domain by masked tone cepstrum modification

| Cover audio | Masked frequencies@ | Stego imperceptible from host? | Embedding Detectible in Spectro-gram? | Embedded Bit rate, Bits/s |
|---|---|---|---|---|
| Clean (TIMIT) | 906.25 Hz, 1218.8 Hz | Yes | Barely | 61.6 |
| Clean (TIMIT) | 1937.5 Hz, 1062.5 Hz | Yes | No | 61.6 |
| Noisy (ATC) | 3000 Hz, 2750 Hz | Yes | Yes* | 62.5 |
| Noisy (ATC) | 2625 Hz, 2500 Hz | Yes | No | 62.5 |

@These frequencies are in the masked regions of most, but not all, of the frames
*When all bits are set to the same value Data retention in the presence of noise after cepstrum modification was studied by adding Gaussian noise at varying power levels as a fraction of stego frame power. At a signal-to-noise power ratio (SNR) of approximately 33 dB, for example, a BER of 3 to 6 out of 179 bits of random data was observed. Higher noise levels proportionally increased the BER. Table 4 shows the BER for different noise levels for the clean and noisy cover speeches used.

TABLE 4

BER Vs. Gaussian Noise added to tone cepstrum-modified Stego

| Host SNR@, dB | Clean (TIMIT) | Noisy (ATC) |
|---|---|---|
| 40 | 0-1 | 0-2 |
| 33 | 3-6 | 2-5 |
| 25 | 10-13 | 20-23 |
| 10 | 65-75 | 152-161 |

@stego frame power to noise power

Figure 17:
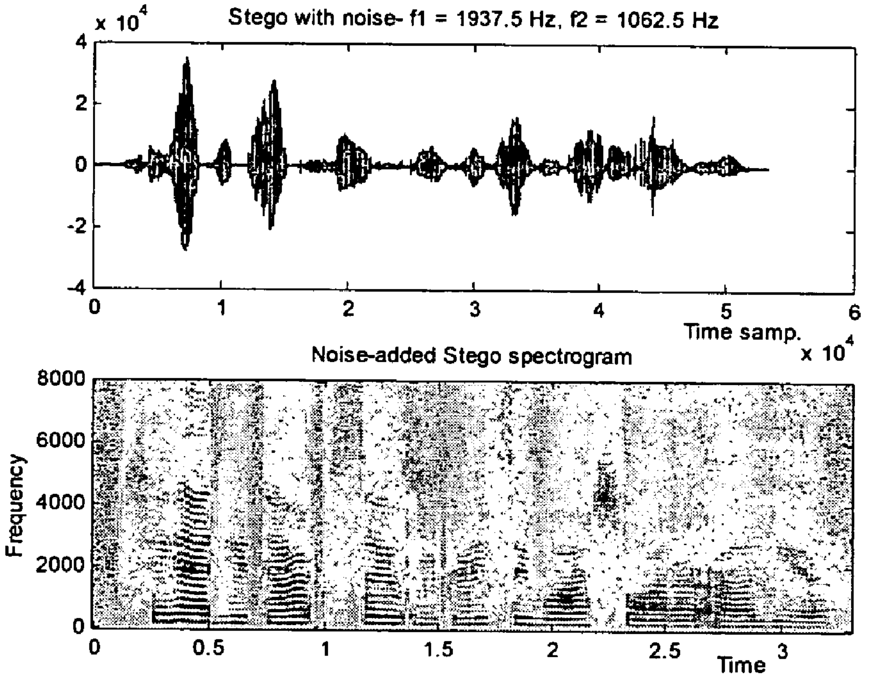
FIG. 17 shows stego waveform and spectrogram with noise added for 33 dB of frame power-to-noise power.

Variability in BER at any given SNR resulted due to differences in data—using a random number generator, different data bits were embedded in each case. This suggests that careful adjustment of the threshold for bit detection may alleviate the problem. Another point observed was that in most cases bit errors occurred in frames that were transmitted without embedding, or those that did not have the tone frequencies in their perceptually masked regions. Hence, by eliminating frames known to have no embedded data from being processed for data detection at the receiver (as a second key), BER can be significantly reduced. Additionally, using only the frames that had significantly large margins at the tone frequencies from their corresponding masking threshold levels will minimize errors due to noise. FIG. 17 shows a stego with Gaussian noise at 33 dB of signal power in each frame. An observation of the waveforms of the stego with and without noise indicates that the embedded signal—appearing slightly different from the host signal—may be construed to have transmission noise instead of hidden information. Hence, embedding may be concealed from ready detection.

Bandpass filtering is another possible attack on the embedded audio during transmission. Filtering by attackers may normally be limited to either the lower end of frequencies (up to 1000 Hz) or the upper end (above 3 kHz to 5 kHz) so as not to remove the cover audio quality completely. By choosing embedding frequencies that are in the midband of masked regions, the cepstral domain embedding retains data under filtering type of attacks. This was verified using both clean and noisy cover utterances with a passband of 300 Hz-5000 Hz for the clean cover and 300 Hz-3000 Hz for the noisy cover utterances.

Figure 18:
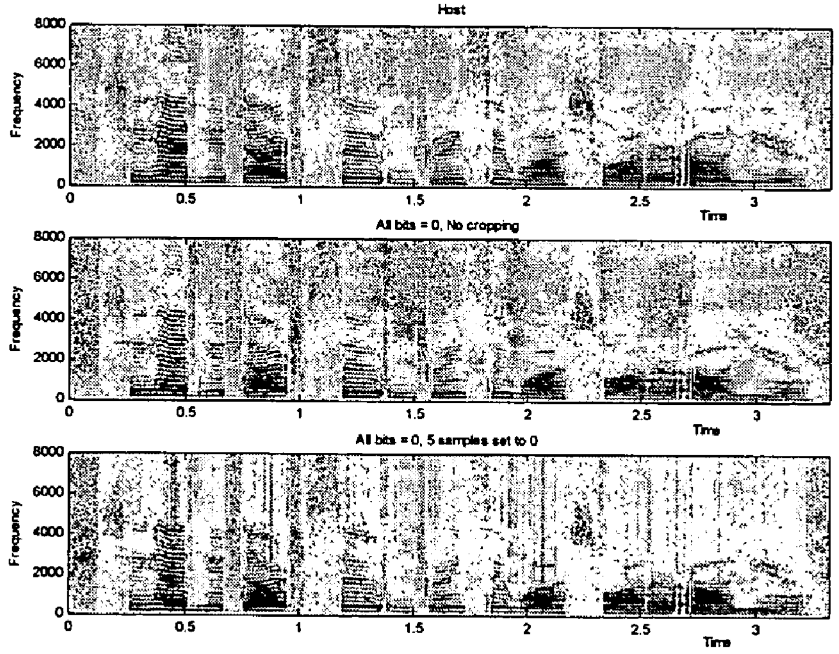
FIG. 18 shows effect of cropping—Spectrograms of host, stego with all bits of 1's and stego with replacement of randomly chosen five samples by zeros.

Cropping is a serious attack on stego to thwart retrieval of embedded information. In this attack, random samples of intercepted stego frames are replaced with zeros. Attackers may remove about one in 50 samples of each frame without causing any perceptual difference in speech quality. For the cepstrum-modified stego, from one to 5 samples from each embedded and quantized frame were removed randomly and replaced with zeros; speech and data were reconstructed from the received cropped frames. Speech quality deteriorated, as expected, as more samples were replaced by zeros. BER of 1 to 22—with a slight change in each case of 1 to 5 samples/frame—was observed. (Here again, variation in BER for the same number of samples replaced is due to the randomness of the samples removed.) Apart from contributing to noisy speech due to sudden change in amplitude to zero, stego sample in time-domain replacement also alters the spectral content of the frame; hence, it affects the log spectral ratio employed in detecting embedded data bit. FIG. 18 shows the spectrograms of the host (top) and stego without sample replacement (middle). The bottom spectrogram for the stego with 5 random samples in each frame replaced by zeros shows deteriorated spectral quality which leads to significant BER. Clearly, when the received speech quality is affected seriously, correct data retrieval becomes impractical without error detection and correction methods.

BER due to random cropping and replacement of samples with zeros was much higher for the case of using the noisy ATC cover speech. This is because of the prevalence of impulse type amplitude variations in the host which, when replaced by zeros after embedding, caused incorrect spectral ratios for bit detection. Bit duplication and majority voting, for example, can be a simple technique for reducing BER to some extent. With a large payload, however, more sophisticated methods such as those incorporating spread spectrum can be readily implemented for data assurance in the case of clean cover utterances.

Appendix A shows Matlab code from one embodiment of the present invention and Appendix B shows results from an experiment using the Matlab code.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A method of embedding data in a host audio signal, comprising:

defining a set of frames of said host audio signal;

for each frame, determining a plurality of masked frequencies, those being spectral points having a power level below a masking threshold for the frame;

selecting the two most commonly occurring masked frequencies f1 and f2 in said set of frames of said host audio signal;

modifying a representation of each frame, using an audio steganography processor, at said masked frequencies f1 and f2 in accordance with a desired value of data in the frame, said modification at f1 and f2 being performed in a complementary manner to embed a single bit value;

excluding frames with less than a minimum number of spectral points having a power level below the masking threshold for the frame; and normalizing the sound pressure level of each frame prior to determining said masking threshold;

wherein said masking threshold for each frame varies in level with frequency, and wherein said modifying includes obtaining a cepstrum of each frame and modifying the frame cepstrum to produce complementary changes of the spectrum at said masked frequencies f1 and f2 to correspond to a desired bit value.

2. The method of claim 1, wherein said modification of the frame cepstrum comprises:

setting a value of the spectrum of said frame at f1 and f2 equal to the mean value of said frame spectrum at f1 and f2; and embedding one of a first or second data value at f1 and f2 by modifying said cepstrum cep according to a) for said first data value, $$mod\_cep=cep+\alpha(c1(1:n))-\beta(c2(1:n)),\text{ and}$$

b) for said second data value, $$mod\_cep=cep-\alpha(c1(1:n))+\beta(c2(1:n))$$

where mod_cep is the modified cepstrum, c1 is a cepstrum of a sinusoid at frequency f1, c2 is a cepstrum of a sinusoid at frequency f2, and $\alpha$ and $\beta$ are determined empirically or based on a fraction of frame power.

3. An audio steganography apparatus, comprising:

a) an input for receiving a host audio signal;

b) a processor programmed to 1) define a set of frames of said host audio signal;

2) for each frame, determine a plurality of masked frequencies, those being spectral points having a power level below a masking threshold for the frame;

3) select the two most commonly occurring masked frequencies f1 and f2 in said set of frames of said host audio signal; and 4) modify a representation of each frame at said masked frequencies f1 and f2 in accordance with a desired value of data in the frame, said modification at f1 and f2 being performed in a complementary manner to embed a single bit value; and c) a transmitter for transmitting said host audio signal with said data embedded therein;

wherein said processor is further programmed to exclude frames that have less than a minimum number of spectral points having a power level below the masking threshold for the frame; and wherein said processor obtains a cepstrum of each frame and modifies the frame cepstrum to produce complementary changes of the spectrum at said masked frequencies f1 and f2 to correspond to a desired bit value.

4. The apparatus of claim 3, wherein said processor modifies the frame cepstrum by setting a value of the spectrum of said frame at f1 and f2 equal to the mean value of said frame spectrum at f1 and f2; and embedding one of a first or second data value at f1 and f2 by modifying said cepstrum cep according to a) for said first data value, $$mod\_cep=cep+\alpha(c1(1{:}n))-\beta(c2(1{:}n)),\text{ and}$$

b) for said second data value, $$mod\_cep=cep-\alpha(c1(1{:}n))+\beta(c2(1{:}n))$$

where mod_cep is the modified cepstrum, c1 is a cepstrum of a sinusoid at frequency f1, c2 is a cepstrum of a sinusoid at frequency f2, and α and β are determined empirically or based on a fraction of frame power.

5. A method of embedding data in a frame of a host audio signal, comprising:

determining a masking threshold for said frame;

determining masked frequencies within said frame having a power level below said masking threshold;

selecting a masked frequency;

obtaining a cepstrum of a sinusoid at said selected masked frequency; and modifying said frame, using an audio steganography processor, by an offset to correspond to an embedded data value, said offset derived from said cepstrum of said masked frequency.

6. The method of claim 5, further comprising normalizing sound pressure level of said frame prior to determining said masking threshold for said frame.

7. The method of claim 6, further comprising excluding said frame from said modification if said frame has less than a minimum number of masked frequencies.

8. The method of claim 7, further comprising calculating number of occurrences of each masked frequency in all frames of said host audio signal, said selected masked frequency being selected from most commonly occurring masked frequencies.

9. The method of claim 8, wherein said selecting includes selecting a pair of masked frequencies from the most commonly occurring masked frequencies; and wherein said modifying includes modifying the cepstrum of said frame at said pair of masked frequencies by respective offsets to correspond to an embedded data value.

10. The method of claim 9, wherein said offsets are complementary.

11. An apparatus for embedding data in a frame of a host audio signal, comprising:

means for determining a masking threshold for said frame;

means for determining masked frequencies within said frame that have power level below said masking threshold;

means for selecting a masked frequency;

means for obtaining a cepstrum of a sinusoid at said selected masked frequency; and means for modifying said frame by an offset to correspond to an embedded data value, said offset derived from said cepstrum of said masked frequency.

12. The apparatus of claim 11, further comprising excluding said frame from said modification if said frame has less than a minimum number of masked frequencies.

13. The apparatus of claim 12, further comprising calculating number of occurrences of each masked frequency in all frames of said host audio signal, said selected masked frequency being selected from most commonly occurring masked frequencies.

14. The apparatus of claim 13, wherein said selecting means selects a pair of masked frequencies from the most commonly occurring masked frequencies; and wherein said modifying means modifies the cepstrum of said frame at said pair of masked frequencies by respective offsets to correspond to an embedded data value.

15. The apparatus of claim 14, wherein said offsets are complementary.

* * * * *